June 30, 1970 D. L. BAHRS ET AL 3,518,630

DATA PROCESSING SYSTEM INCLUDING PLURAL MEMORY CONTROLLERS

Filed June 3, 1966

INVENTORS
DAVID L. BAHRS
JOHN F. COULEUR
WILLIAM A. SHELLY
RICHARD L. RUTH

BY

ATTORNEYS

United States Patent Office 3,518,630
Patented June 30, 1970

3,518,630
DATA PROCESSING SYSTEM INCLUDING PLURAL MEMORY CONTROLLERS

David L. Bahrs, Liverpool, N.Y., and John F. Couleur, Richard L. Ruth, and William A. Shelly, Phoenix, Ariz., assignors to General Electric Company, a corporation of New York Filed June 3, 1966, Ser. No. 555,165
Int. Cl. H04j 5/00
U.S. Cl. 340—172.5 8 Claims

ABSTRACT OF THE DISCLOSURE

A data processing system incorporating a processor, a plurality of memories, an input/output controller and connected input/output device, and a plurality of memory controllers. Communication among the subsystems is provided exclusively through the memory controllers to coordinate the execution of operations and the transfers of operation among the subsystems.

The present invention pertains to data processing systems, and more specifically, to those systems utilizing control means for controlling communication among the subsystems of the data processing system.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the informtion flow to and from the various input/output devices and also awards priority when more than one input/output device is attempting to communicate with the data processing system. Since input/output devices are usually electromechanical in nature and necessarily have much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, and input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

Substantial increases in system flexibility may be achieved through the utilization of plural memory controllers. Unexpected advances in data transfer and system configuration are obtainable when a plurality of memory controllers are each connected to a different memory device and all are connected to the data processor and the input/output controller. In this plural memory controller configuration the data processor and the input/output controller may access either of two memories through the corresponding memory controllers; further, the data processor may communicate with the input/output controller through either of the memory controllers thus effectively doubling the flexibility of data transfer to and from memories and among the subsystems. The input/output controller includes means for selecting a predetermined one of the plural memory controllers as the base controller which thereafter controls access to a specific reserve portion of the total memory intended for use primarily by the input/output controller; each of the memory controllers includes a priority awarding scheme thereby permitting the unique and unexpected combination wherein a processor may have priority to a particular block of memory and a different device (such as an input/output controller or other processor) may have priority in another block of memory. The multiple memory controller configuration also exhibits unique advantages in instances where the system is simultaneously executing two or more programs.

It is therefore an object of the present invention to provide a data processing system having substantially increased flexibility through the utilization of plural memories the access to each of which is controlled by a memory controller.

It is another object to the present invention to provide a data processing system having plural memory controller means each controlling access to a different memory device.

It is still another object to the present invention to provide a data processing system comprising a plurality of subsystems wherein the transfer of information among the subsystems is controlled by a plurality of memory controllers.

It is a further object of the present invention to provide a data processing system wherein all subsystems thereof communicate through the memory controllers and wherein each memory controller regulates the transfer of data and instructions to and from a memory device associated therewith.

It is still another object of the present invention to provide a data processing system comprising a plurality of subsystems and memory controllers, each memory controller being connected to a different memory device and including means for awarding priority of communication to subsystems connected thereto.

It it another object of the present invention to provide a data processing system comprising a plurality of subsystems and memory controllers, each memory controller being connected to a different memory device and including means for awarding priority of communication to subsystems connected thereto and wherein the priority of the subsystems may be different in different memory controllers.

These and other objects and advantages of the present invention will become apparent to those skilled in the art as the description of the invention proceeds.

Certains portions of the apparatus herein disclosed are not of our invention, but are the inventions of:

David L. Bahrs, John F. Couleur, Richard L. Ruth, and William A. Shelly, as defined by the claims of their application, Ser. No. 555,491, filed June 6, 1966, now Pat. No. 3,413,612;

David L. Bahrs, John F. Couleur, Richard L. Ruth, and William A. Shelly, as defined by the claims of their application, Ser. No. 558,515, filed June 17, 1966;

Harry N. Cantrell and John F. Couleur, as defined by the claims of their application, Ser. No. 563,519, filed July 7, 1966;

Robert Cohen, John F. Couleur, and Richard L. Ruth, as defined by the claims of their application, Ser. No. 563,521, filed July 7, 1966, now abandoned for Ser. No. 822,748;

Robert Cohen, John F. Couleur, and William A. Shelly, as defined by the claims of their application, Ser. No. 563,522, filed July 7, 1966;

Robert Cohen, William A. Shelly, and Samuel M. Vidulich, as defined by the claims of their application, Ser. No. 567,221, filed July 22, 1966;

David L. Bahrs and John F. Couleur, as defined by the claims of their application, Ser. No. 567,222, filed July 22, 1966;

John F. Couleur and Richard L. Ruth, as defined by the claims of their application, Ser. No. 569,750, filed Aug. 2, 1966;

John F. Couleur, Philip F. Gudenschwager, Richard L. Ruth, William A. Shelly, and Leonard G. Trubisky, as defined by the claims of their application, Ser. No. 577,376, filed Sept. 6, 1966;

John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

DESCRIPTION OF FIGURES

The present invention may more readily be described by reference to the accompanying drawings in which.

Figure 1:
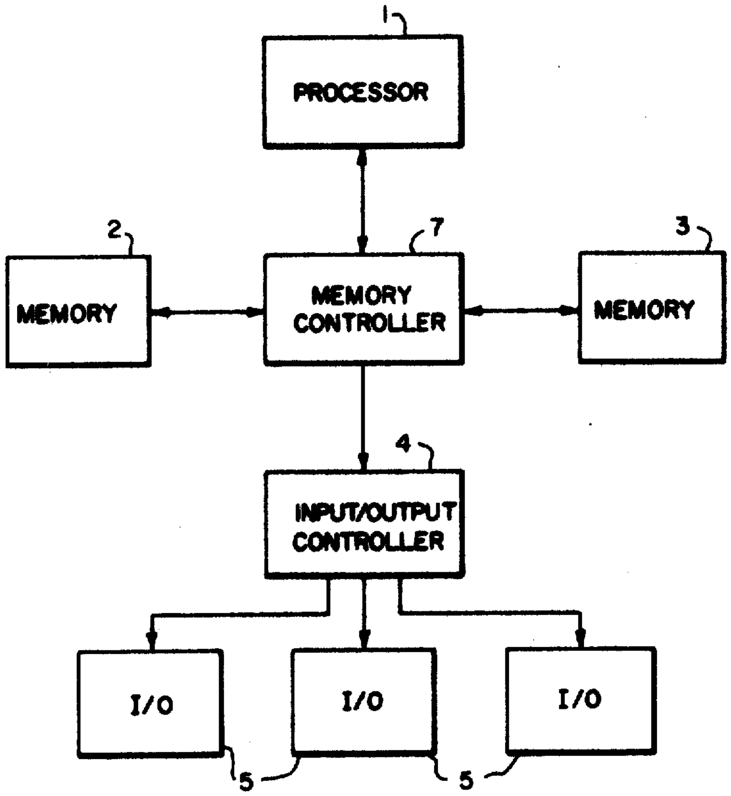
FIG. 1 is a block diagram of a data processing system in a single memory controller configuration.

For a complete description of the system of FIG. 1 and of my invention, reference is made to U.S. Pat. No. 3,413,613 issued to David L. Bahrs, John F. Couleur, Richard L. Ruth, and William A. Shelly, on Nov. 26, 1968, and assigned to the assignee of the present invention. More particularly, attention is directed to FIGS. 2–120 and to the specification beginning at column 4, line 32 and ending at column 121, line 42 inclusive of U.S. Pat. No. 3,413,613 which are incorporated herein by reference and made a part hereof.

What is claimed is:

1. A data processing system comprising: a communicating device comprising a data processor for manipulating data in accordance with the instructions of a program and including means for generating a channel interrupt request signal; a communicating device comprising an input/output controller for connection to peripheral devices to control the transfer of data to and from said peripheral devices and including means for generating a channel interrupt request signal; a plurality of memory devices for storing data and instructions; a plurality of memory controllers each controlling access to a different memory device and all connected to said communicating devices, said memory controllers responsive to said channel interrupt request signals to provide communication among said communicating device and between a requesting communicating device and a memory device; said memory controllers also including means for awarding priority to a predetermined one of said communicating devices when a plurality of channel interrupt request signals are simultaneously received by a memory controller.

2. A data processing system comprising: a plurality of memory devices for storing data and instructions; a communicating device comprising a data processor for manipulating data in accordance with the instructions of a program, said data processor requiring access to said memory devices for obtaining data and instructions, said data processor including means, when in need of data and instructions, for generating a channel interrupt request signal; a communicating device comprising an input/output controller for connection to peripheral devices to control the transfer of data to and from said peripheral devices, said input/output controller requiring access to said memory devices for receiving input/output controller instructions and for storing and retrieving data received from and to be transmitted to said peripheral devices, said input/output controller including means, when in need of data and instructions, for generating a channel interrupt request signal; a plurality of memory controllers each connected to a different memory device and all connected to all of said communicating devices, said memory controllers responsive to said channel interrupt request signals to provide communication between a requesting communicating device and a memory device; said memory controllers also including means for awarding priority to a predetermined one of said communicating devices when a plurality of channel interrupt request signals are simultaneously received by a memory controller.

3. A data processing system comprising: a plurality of memory devices for storing data and instructions; a communicating device comprising a data processor for manipulating data in accordance with the instructions of a program, said data processor requiring access to said memory devices for obtaining data and instructions, said data processor including means, when in need of data and instructions, for generating a channel interrupt request signal; a communicating device comprising an input/output controller for connection to peripheral devices to control the transfer of data to and from said peripheral devices, said input/output controller requiring access to said memory devices for receiving input/output controller instructions and for storing and retrieving data received from and to be transmitted to said peripheral devices, said input/output controller including means, when in need of data and instructions, for generating a channel interrupt request signal; a plurality of memory controllers each connected to a different memory device and all connected to all of said communicating devices, said memory controllers responsive to said channel interrupt request signals to provide communication between a requesting communicating device and a memory device; said memory controllers also including means for awarding priority to a predetermined one of said communicating devices when a plurality of channel interrupt request signals are simultaneously received by a memory controller, and including means for storing an indication of the receipt of a channel interrupt request signal when a communicating device generating the signal is not awarded priority.

4. A data processing system comprising: a data processor for manipulating data in accordance with the instructions of a program and including means for generating a channel interrupt request signal; an input/output control means for connection to peripheral devices to control the transfer of data to and from said peripheral devices and including means for generating a channel interrupt request signal; a plurality of memory devices for storing data and instructions; a plurality of memory controllers each controlling access to a different memory device and all connected to said processor and to said input/output control means, said memory controllers providing data storage and each responsive to channel interrupt request signals to provide communication among said data processor, input/output control means, memory devices, and memory controller, said memory controller also including means for storing an indication of the receipt of a channel interrupt request.

5. A data processing system comprising: a communicating device comprising a data processor for manipulating data in accordance with the instructions of a program and including means for generating a channel interrupt request signal; a communicating device comprising an input/output controller for connection to peripheral devices to control the transfer of data to and from said peripheral devices and including means for generating a channel interrupt request signal; a plurality of memory devices for storing data and instructions; a plurality of memory controllers each connected to a different memory device and all connected to said communicating devices, said memory controllers providing data storage and each responsive to said channel interrupt request signals to provide communication between a requesting communicating device and a memory device and between a requesting communicating device and a memory controller; said memory controllers also including means for awarding priority to a predetermined one of said communicating devices when a plurality of channel interrupt request signals are simultaneously received by a memory controller.

6. A data processing system comprising: a communicating device comprising a data processor for manipulating data in accordance with the instructions of a program and including means for generating a channel interrupt request signal; a communicating device comprising an input/output controller for connection to peripheral devices to control the transfer of data to and from said peripheral devices and including means for generating a channel interrupt request signal; a plurality of memory devices for storing data and instructions; a plurality of memory controllers each connected to a different memory device and all connected to said communicating devices, said memory controllers providing data storage and each responsive to said channel interrupt request signals to provide communication between a requesting communicating device and a memory device and between a requesting communicating device and a memory controller; said memory controllers aso including means for awarding priority to a predetermined one of said communicating devices when a plurality of channel interrupt request signals are simultaneously received by a memory controller, and including means for storing an indication of the receipt of a channel interrupt request signal when a communicating device generating a request signal is not awarded priority.

7. A data processing system comprising: a plurality of memory devices for storing data and instructions; a communicating device comprising a data processor for manipulating data in accordance with the instructions of a program, said data processor requiring access to said memory devices for obtaining data and instructions, said data processor including means, when in need of data and instructions, for generating a channel interrupt request signal; a communicating device comprising an input/output controller for connection to peripheral devices to control the transfer of data to and from said peripheral devices, said input/output controller requiring access to said memory devices for receiving input/output controller instructions and for storing and retrieving data received from and to be transmitted to said peripheral devices, said input/output controller including means, when in need of data and instructions, for generating a channel interrupt request signal; a plurality of memory controllers each connected to a different memory devices and all connected to all of said communicating devices, said memory controllers responsive to said channel interrupt request signals to provide communication between a requesting communicating device and a memory device, and between a requesting communicating device and a memory controller; said memory controllers also including means for awarding priority to a predetermined one of said communicating devices when a plurality of channel interrupt request signals are simultaneously received by a memory controller.

8. A data processing system comprising: a plurality of memory devices for storing data and instructions; a communicating device comprising a data processor for manipulating data in accordance with the instructions of a program, said data processor requiring access to said memory devices for obtaining data and instructions, said data processor including means, when in need of data and instructions, for generating a channel interrupt request signal; a communicating device comprising an input/output controller for connection to peripheral devices to control the transfer of data to and from said peripheral devices, said input/output controller requiring access to said memory devices for receiving input/output controller instructions and for storing and retrieving data received from and to be transmitted to said peripheral devices, said input/output controller including means, when in need of data and instructions, for generating a channel interrupt request signal; a plurality of memory controllers each connected to a different memory device and all connected to all of said communicating devices, said memory controllers responsive to said channel interrupt requests signals to provide communication between a requesting communicating device and a memory device, and between a requesting communicating device and a memory controller; said memory controllers also including means for awarding priority to a predetermined one of said communicating devices when a plurality of channel interrupt request signals are simultanoeusly received by a memory controller, and incuding means for storing an indication of the receipt of a channel interrupt request signal when a communicating device generating a request signal is not awarded priority.

References Cited

UNITED STATES PATENTS

| | | | |
|---|---|---|---|
| 3,242,467 | 3/1966 | Lamy | 340—172.5 |
| 3,323,109 | 5/1967 | Hecht et al. | 340—172.5 |
| 3,343,140 | 9/1967 | Richmond et al. | 340—172.5 |
| 3,354,430 | 11/1967 | Zeitler et al. | 340—172.5 |

PAUL J. HENON, Primary Examiner

H. E. SPRINGBORN, Assistant Examiner